Aug. 23, 1960     C. T. BUTLER     2,949,638
METHOD FOR PRODUCING SPECTACLE TEMPLATES
Filed April 2, 1958
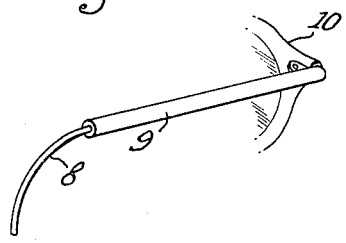
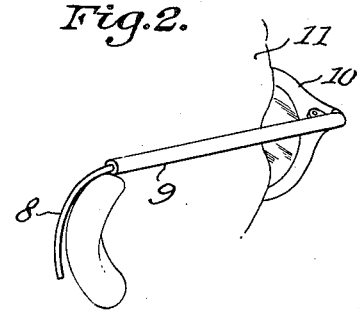
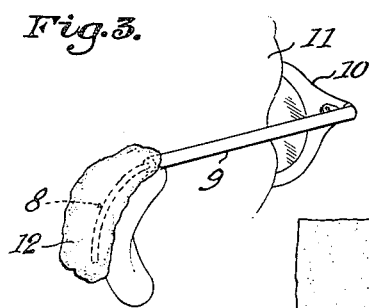
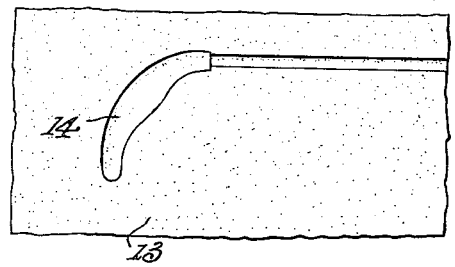
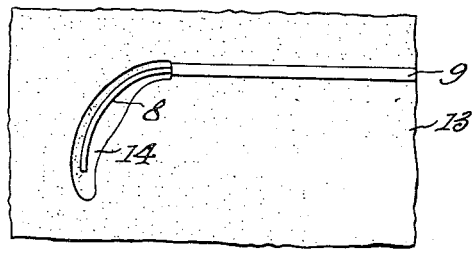
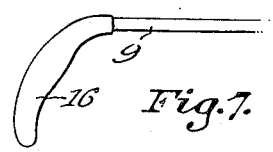
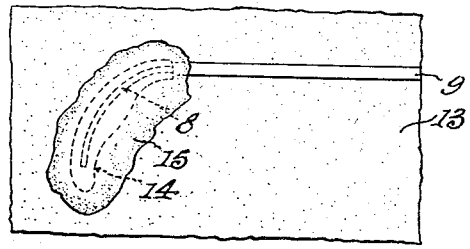
INVENTOR.
Cecil T. Butler
BY
ATTORNEYS

United States Patent Office 2,949,638
Patented Aug. 23, 1960

2,949,638

METHOD FOR PRODUCING SPECTACLE TEMPLATES

Cecil T. Butler, 12715 Atherton Drive, Silver Spring, Md.

Filed Apr. 2, 1958, Ser. No. 726,020

2 Claims. (Cl. 18—55.05)

(Granted under Title 35, U.S. Code (1952), sec. 266)

The invention described herein may be manufactured and used by or for the Government for governmental purposes without the payment of any royalty thereon.

The present invention relates to a method of making spectacle templates, the fit of which represents a radical improvement over that which presently exists in the art.

It is a general object of this invention to provide a method of creating spectacle templates, the ear loop portions of which follow exactly the contour of the wearer's head and ears thereby assuring a comfortable, slip-free grip.

It is well known to all who wear glasses that generally if the glasses do not slip down on the nose, it is because the templates fit so tightly at points of contact along the head and ears as to cause discomfort and annoyance. Even where the glasses are accurately and painstakingly fitted, bodily movements, vibration, stooping and engaging in active sports will generally cause the glasses to slip or shift and eventually cause undue pressure at various points of contact.

The present invention does away with such discomfort and slippage by insuring a perfect individual fit which will not be subject to alteration by the activities mentioned above.

Such a fit will be of benefit to all who must wear glasses but especially will be beneficial to those cases where circumstances demand a perfect fit. For example, in selected occupations, such as those involving riding on vibrating or jarring machinery (tanks, heavy construction equipment, etc.), the spectacle templates of the present invention will be of great assistance. The fitted templates will be a great boon also to those persons who have wounds involving the ear or mastoid portion of the temporal bone or who have an injury of the nasal structure.

The attendant difficulties of ordinary templates outlined above have been dealt with in the past in various ways. Heavier templates having strong contact at the side of the head with little or no curving of the ear portions have been used to alleviate discomfort, but usually at the expense of slippage. Ear stops just behind each ear along the spectacle template have been constructd to avoid such slippage. Other methods have been attempted such as modifying the bridgepiece or through the use of particular materials which adapt their shape to the head. With all these attempts, there has been none that utilizes the principle embodied in the present invention. Glasses fitted by the present invention assure perfect comfort, security of placement and freedom of movement of the head and body. It is not possible for such glasses to slip, slide, or become displaced due to the wearer's movements or perspiration. The glasses remain comfortably secure to the contour of the head even during underwater swimming. They are ideal for persons who must wear glasses all of the time, especially for those following active or hazardous pursuits in work or sports.

Other objects and advantages of the present invention will become apparent from the following description taken in connection with the accompanying drawings, and it will be apparent that many changes may be made in the details of construction, arrangement of parts, and methods shown and described without departing from the spirit of the invention as expressed in the accompanying claims. The invention, therefore, is not limited to the exact details of construction, arrangement of parts, and methods shown and described, as the preferred examples are given only by way of illustration.

Referring to the drawings—

Fig. 1 shows a template, the ear portion of which has been stripped of its original coating where necessary to expose the template wire;

Fig. 2 is a perspective view of the template as adapted to the patient's head;

Fig. 3 is a view similar to Fig. 2 showing how the mold material is applied to the patient's head;

Fig. 4 is the impression made in the stone mold of the template;

Fig. 5 shows the impression with the cleaned template in place;

Fig. 6 shows the impression filled with resin and the stone cap in place; and

Fig. 7 is the finished product, trimmed and polished.

Referring to the drawings in detail, Fig. 1 shows the eyeglasses 10 with template 9 and the stripped-down ear portion 8 made of pliable wire or similar substance. Fig. 2 shows the eyeglasses fitted on the patient's head 11. The patient adjusts the eyeglasses to a comfortable position. The stripped-down wires 8 are then adapted to about one-eighth inch from both the ear and the head as shown in Fig. 2. This is accomplished by bending the wire 8 where necessary to conform generally to the contours of the head. After the wires have been adapted, impression plaster of Paris or other suitable mold material is mixed to a creamy consistency and this material is applied to the ears and side of the head, completely surrounding the wire 8 as shown in Fig. 3. When the plaster of Paris has hardened (about 1½ to 2 minutes), the impression 12 is removed from the head and trimmed down to approximately the size desired in the finished product, all the while maintaining the contoured outlines of the head and ear. This impression is then coated with a thin coating of petroleum jelly and invested in artificial stone, plaster of Paris, or other suitable material.

A preferred composition of the artificial stone is as follows:

| | Parts |
|---|---|
| Calcium hydrate | 19 |
| Pure silica | 20 |
| Aluminum oxide | 42 |
| Water | balance |

After the stone has hardened, a period of approximately 5 to 8 minutes, a cap of stone is poured on the embedded impression and stone investment. When the stone cap 15 has hardened, it is removed from the base stone 13. The plaster of Paris impression 12 is next removed from the stone base, leaving the outline impression 14 in the stone base 13 as shown in Fig. 4. The plaster of Paris is then stripped off the wire ear portion 8. Carbon tetrachloride or similar solvent may be used to clean the wire 8, which is then painted with a coat of modern foil. After the foil has dried, the template 9 and ear portion 8 are replaced in the stone mold 13 as shown in Fig. 5. After the foil has dried, acrylic (methyl methacrylate resin) is mixed and when it has reached a dough consistency, about 3 to 5 minutes, it is pressed in around the wire and the stone cap 15 is placed on top of the acrylic and the entire mold is put into a press until the acrylic hardens. This takes 10 to 15 minutes. The template is then removed from the stone mold, trimmed to desired size and polished. Fig. 7 represents the finished product showing the acrylic covered ear portion 16.

The preferred acrylic is known and used in the dental trade as a repair resin and comes in a liquid monomer and a powder polymer form. These repair acrylics are particularly desirable as they generate their own heat. The liquid and powder are mixed (one part liquid to three parts powder) to effect the doughy consistency described above.

In addition, the process may be applied with any other resins that set in the absence of heat and at little or no pressure. Applicable resins other than methyl methacrylate which might be used are vinyl acetate, methyl acrylate, acrylonitrile, ethyl methacrylate, butyl methacrylate, etc.

An alternate method of effecting the instant invention and incorporating therein the same basic principle of individual fitting of the ear gripping portion of eye glass templates is the direct method. This method is possible because of the low heat generated by the repair resin described above.

The template wire is adapted to the patient's head as heretofore described within approximately one-eighth inch from both head and ear and conforming generally to the contours of the head. The head and ear adjacent to the wire is then damped with liquid monomer acrylic and then an even layer of the powder polymer acrylic is sprinkled upon the liquid acrylic. This alternating process is continued, building up the desired thickness and surrounding and enveloping the wire. The acrylic is then allowed to harden (5 to 8 minutes), and the template removed, trimmed and polished. The liquid and powder acrylic may also be mixed to a pouring consistency, poured directly upon the ear and head, enveloping the shaped wire portion of the template, allowed to harden (5 to 8 minutes), removed, trimmed, and polished. These direct methods have the advantage of eliminating the modeling step involving the use of plaster of Paris and the artificial stone mold.

In all methods described, it will be noted that the patient himself determines the amount of pressure he desires, the comfort of the fit of the eyeglasses and their exact positioning. Eyeglasses thus fitted assure perfect comfort, security of placement, and freedom of movement of the head and body.

The foregoing descriptions have assumed the template to contain a wire core coated with plastic or having some covering. This wire core is usually present in the template. However, where a template is constructed that has no such core, the ear portion could be removed entirely and a wire core fashioned for the ear portion which when covered as described above, would function in the same manner.

Although the present invention has been described with particular reference to the specific details of certain embodiments thereof, it is not intended that such details shall be regarded as limitations upon the scope of the invention, except insofar as included in the accompanying claims.

I claim:

1. In a method of making individually fitted spectacle templates which are characterized by freedom from slippage and objectionable pressure on ears, temples and head of a wearer, the spectacles comprising a frame having plastic composition templates including ear loop portions and reinforcing metallic wires extending longitudinally through the templates including the ear loop portions and embedded in the plastic composition of the templates, the improvements which comprise completely removing the plastic composition of the templates between their ear loop portions and ends until corresponding lengths of the reinforcing wires are bared, applying the spectacles to a prospective wearer, producing a clearance between the templates of the spectacles and ears and adjacent head portions of the wearer by allowing the wearer to self-adjust the spectacles to a desired pressure, maximum comfort of fit, and exact positioning with respect to the ears and adjacent head portions of the wearer, shaping the resulting lengths of bared wires of the templates to conform approximately to the contours of the ears and adjacent head portions of the wearer while maintaining the clearance between the bared wires and the ears and adjacent head portions of the wearer, filling the clearances with an air-hardenable moldable material and embedding the bared wires therein, allowing the material to harden in situ for reproducing in its surface all details of configuration of surfaces of the ear and adjacent head portions of the wearer, and removing the templates together with their resulting embedded wires from the wearer without disturbance of the embedding hardened moldable material.

2. The method of making an individually fitted spectacle template which is charaacterized by freedom from slippage and objectionable pressure on temples, head and ears of a wearer, the spectacles including a frame having a plastic composition template including an ear loop portion and a reinforcing metallic wire extending longitudinally through the template including the ear loop portion and embedded in the plastic composition of the template, which method comprises removing the plastic composition from the ear loop portion of the template beginning at the top thereof and continuing to its end until a corresponding length of the reinforcing wire is bared, and producing a clearance between the template and an ear and adjacent head portion of a wearer by allowing the wearer to self-adjust the spectacles to a desired pressure, maximum comfort of fit and exact positioning with respect to the ears, eyes and head portions of the wearer, shaping the resulting bared wire of the template to conform approximately to the contour of the ear and adjacent head portion of the wearer while avoiding actual contact of the bared wire with the ear and adjacent head portions of the wearer, filling intervening spaces between the wire and the ear and adjacent head portions of the wearer with an air-hardenable moldable material until the exposed lentgh of the wire is embedded in the material, allowing the material to harden in situ on the wearer and around the wire of the template, thereby producing a detailed molded impression of the ear and contiguous head portions of the wearer, investing the resulting impression in a hardenable fluid mold composition, hardening the mold composition around the impression, thereby forming in the mold composition a mold cavity corresponding to the impression, removing the impression from the mold cavity, removing the hardened impression material from the wire to again expose the said length of the wire, replacing the resulting exposed wire in the mold cavity, filling the cavity with an air-hardenable, freely-flowing plastic composition, thereby embedding the exposed wire in the plastic composition and reproducing in the said plastic composition all details of the mold cavity, allowing the plastic material to harden while in the mold cavity, and removing the resulting high-fidelity template from the mold.

References Cited in the file of this patent

UNITED STATES PATENTS

| | | |
|---|---|---|
| 1,753,817 | Aber | Apr. 8, 1930 |
| 1,755,775 | Dunn | Apr. 22, 1930 |
| 2,495,119 | McDevitt | Jan. 17, 1950 |
| 2,759,475 | Van Swaay | Aug. 21, 1956 |